US012803441B2

(12) United States Patent
Kim et al.

(10) Patent No.: US 12,803,441 B2
(45) Date of Patent: Nov. 17, 2026

(54) SOFT START CIRCUIT FOR POWER SYSTEM

(71) Applicant: FADU Inc., Seoul (KR)

(72) Inventors: Seonho Kim, Suwon-si (KR); Kichang Jang, Seoul (KR); Kwanseok Jung, Seoul (KR); Jongchul Chae, Hwaseong-si (KR)

(73) Assignee: FADU Inc., Seoul (KR)

( * ) Notice: Subject to any disclaimer, the term of this patent is extended or adjusted under 35 U.S.C. 154(b) by 80 days.

(21) Appl. No.: 18/680,192

(22) Filed: May 31, 2024

(65) Prior Publication Data

US 2025/0047202 A1 Feb. 6, 2025

Related U.S. Application Data

(60) Provisional application No. 63/530,355, filed on Aug. 2, 2023.

(30) Foreign Application Priority Data

Aug. 2, 2023 (KR) ........................ 10-2023-0100884

(51) Int. Cl.
*H02M 3/158* (2006.01)
*H02M 1/36* (2007.01)

(52) U.S. Cl.
CPC ............. *H02M 3/158* (2013.01); *H02M 1/36* (2013.01)

(58) Field of Classification Search
CPC ................................ H02M 1/36; H02M 3/158
See application file for complete search history.

(56) References Cited

U.S. PATENT DOCUMENTS 6,356,064 B1 * 3/2002 Tonda .................. H03K 17/223 327/539
2012/0049820 A1 * 3/2012 Moussaoui ............. H02M 1/36 323/282
2017/0070149 A1 * 3/2017 Guan ...................... H02M 1/36
2017/0179812 A1 * 6/2017 Kawano ................ H02M 3/156

FOREIGN PATENT DOCUMENTS

JP 2007-159306 A 6/2007
KR 10-2008-0066172 A 7/2008
KR 10-2012-0021219 A 3/2012
KR 10-2017-0072811 A 6/2017
KR 10-2394869 B1 5/2022

OTHER PUBLICATIONS

Korean Office Action Issued on Oct. 5, 2023 corresponds in Korean Patent Application No. 10-2023-0100884. (3 Pages in Korean).
Korean Office Action Issued on Jan. 15, 2024 corresponds in Korean Patent Application No. 10-2023-0100884. (7 Pages in Korean).

* cited by examiner

*Primary Examiner* — Sisay G Tiku
(74) *Attorney, Agent, or Firm* — NSIP Law

(57) ABSTRACT

Disclosed is a soft start circuit 100 for a power system 1. In the soft start circuit 100, an input voltage VIN is applied to charge an output capacitor COUT and output an output voltage VOUT such that a soft start of the power system 1 is achieved. A constant current is supplied onto an electrical path connecting the input voltage VIN and the output voltage VOUT to charge the output capacitor COUT at the soft start time.

10 Claims, 5 Drawing Sheets

SOFT START CIRCUIT FOR POWER SYSTEM

CROSS REFERENCE TO RELATED APPLICATIONS

This application claims the benefit under 35 USC 119(e) of U.S. Provisional Application No. 63/530,355 filed on Aug. 2, 2023, and claims the benefit under 35 USC 119(a) and 365(b) of Korean Patent Application No. 10-2023-0100884, filed on Aug. 2, 2023, in the Korean Intellectual Property Office, the entire disclosure of which is incorporated herein by reference for all purposes.

BACKGROUND OF THE INVENTION

1. Field of the Invention

The present invention relates to a soft start circuit for a power system, and more specifically to a circuit that uses a constant current with low process-voltage-temperature (PVT) variations to short-circuit input and output ends and charge a capacitor of the output end during the soft-start period of a power system.

2. Description of the Related Art

Power systems are used to supply power to electronic devices and electronic loads. Examples of such power systems include DC/DC converters. DC/DC converters are classified into boost converters, which step up the DC input voltage, and buck converters, which step down the DC input voltage.

Referring to FIGS. 1 and 2, a boost converter includes two power switches SW1 and SW2 connected between an output end and a ground end, an inductor connected to an input end electrically connected to a node to which the power switches are connected, and an output capacitor connected to the output end. Each of the power switches is implemented by a diode and a transistor. When an input voltage VIN is applied and an enable (EN) terminal is high, the "on/off" operation of the two power switches is alternately repeated depending on the duty ratio to output an output voltage VOUT higher than the input voltage VIN.

When the enable (EN) terminal is low, i.e. in the early stage when the two power switches are in the "off" state, the application of the input voltage may cause problems. In this case, a current path is formed that connects the input voltage VIN, the inductor, the diode of the power switch SW2, and the output voltage VOUT, as illustrated in FIG. 1, and as a result, a very high charging current is generated, causing damage to an input voltage supply and a chip.

Thus, there is an urgent need for a solution to the problem of excessive current flow in conventional power systems when initial power is supplied.

SUMMARY OF THE INVENTION

The present invention has been made in an effort to solve the problems of the prior art, and an object of the present invention is to provide a soft start circuit for a power system designed in which a constant current is supplied onto an electrical path connecting an input voltage and an output voltage to achieve a soft start of the power system, where the input voltage is initially applied to charge an output capacitor.

A soft start circuit for a power system according to an embodiment of the present invention is designed in which an input voltage is applied to charge an output capacitor and output an output voltage such that a soft start of the power system is achieved wherein a constant current is supplied onto an electrical path connecting the input voltage and the output voltage to charge the output capacitor at the soft start time.

According to an exemplary embodiment of the present invention, the power system may include a boost converter circuit or a power loss protection (PLP) circuit.

According to an exemplary embodiment of the present invention, the soft start circuit may include: a blocking transistor including a first NMOS connected to the electrical path and a first diode electrically connected between a source and a drain of the first NMOS; a reference current generator generating a reference current; a reference voltage generator sensing the reference current to generate a reference voltage; a voltage-current converter including a first resistance and receiving the reference voltage to generate a conversion current as the ratio of the reference voltage to the first resistance; and a blocking transistor controller including a second resistance and receiving the conversion current to generate a gate-source voltage of the first NMOS as the product of the conversion current and the second resistance.

According to an exemplary embodiment of the present invention, the reference current generator may include: a first current mirror including a first PMOS and a second PMOS, each of which includes a source to which a first operating voltage is applied and which form a current mirror structure; and a current source electrically connected to the drain of the first PMOS and supplying a bias current to the second PMOS to generate the reference current.

According to an exemplary embodiment of the present invention, the reference voltage generator may include a sense transistor including a second NMOS and a second diode electrically connected between a source and a drain of the second NMOS wherein the drain of the second NMOS may be electrically connected to a gate of the second NMOS and a drain of the second PMOS and the source of the second NMOS may be grounded.

According to an exemplary embodiment of the present invention, the same N-channel MOSFETs may be used for the first NMOS and the second NMOS.

According to an exemplary embodiment of the present invention, the voltage-current converter may include: an operational amplifier (OP AMP) including a (−) input terminal electrically connected to the gate of the second NMOS such that the reference voltage is applied thereto and a (+) input terminal electrically connected to one end of the first resistance whose the other end is grounded; a third PMOS including a source to which the first operating voltage is applied, a gate electrically connected to an output end of the OP AMP, and a drain electrically connected to a first node to which the first resistance and the (+) input terminal of the OP AMP are electrically connected such that the conversion current flows therethrough; a fourth PMOS including a source to which the first operating voltage is applied and a gate electrically connected to the output end of the OP AMP and using the same P-channel MOSFET as that for the third PMOS such that the conversion current flows therethrough; and a second current mirror including a third NMOS and a fourth NMOS, each of which includes a grounded source and which form a current mirror structure and are electrically connected to each other such that the conversion current is copied to and flows through the fourth NMOS.

According to an exemplary embodiment of the present invention, the blocking transistor controller may include: a charge pump stepping up the input voltage to output a second operating voltage; and a third current mirror including a fifth PMOS and a sixth PMOS, each of which includes a source to which the second operating voltage is applied and which form a current mirror structure, wherein the fifth PMOS may include a drain electrically connected to a drain of the fourth NMOS such that the conversion current is copied to and flows through the sixth PMOS and one end of the second resistance whose the other end is electrically connected to the electrical path, a drain of the sixth PMOS, and a gate of the first NMOS may be electrically connected to a second node.

According to an exemplary embodiment of the present invention, the first resistance and the second resistance may be elements having the same resistance value.

According to an exemplary embodiment of the present invention, the blocking transistor controller may further include: a seventh PMOS including a source to which the second operating voltage is applied and a drain electrically connected to the second node; a third resistance whose one end is electrically connected to the second operating voltage and the other end is electrically connected to a gate of the seventh PMOS and a third node; a fifth NMOS including a drain electrically connected to the other end of the second resistance, a source electrically connected to the electrical path, and a gate electrically connected to the third node; and a sixth NMOS including a drain electrically connected to the third node and a grounded source and operating in a complementary manner to the seventh PMOS.

According to an exemplary embodiment of the present invention, the fifth NMOS may be in the "on" state and the sixth NMOS and the seventh PMOS may be in the "off" state at the soft start time, and the fifth NMOS may be controlled to the "off" state and the sixth NMOS and the seventh PMOS may be controlled to the "on" state when the soft start is completed.

The features and advantages of the present invention will become apparent from the following description with reference to the accompanying drawings.

Prior to the detailed description of the invention, it should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

The soft start circuit of the present invention is used as a constant current source to achieve a soft start regardless of the slew rate of an input voltage, achieving a reduction in peak current. The use of the constant current source enables isolation between the input voltage and an output voltage.

In addition, the soft start circuit of the present invention can be applied to various power systems for energy storage in output capacitors such as power loss protection (PLP) circuits.

Furthermore, the constant current can be precisely controlled through zero process-voltage-temperature (PVT) variation design.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
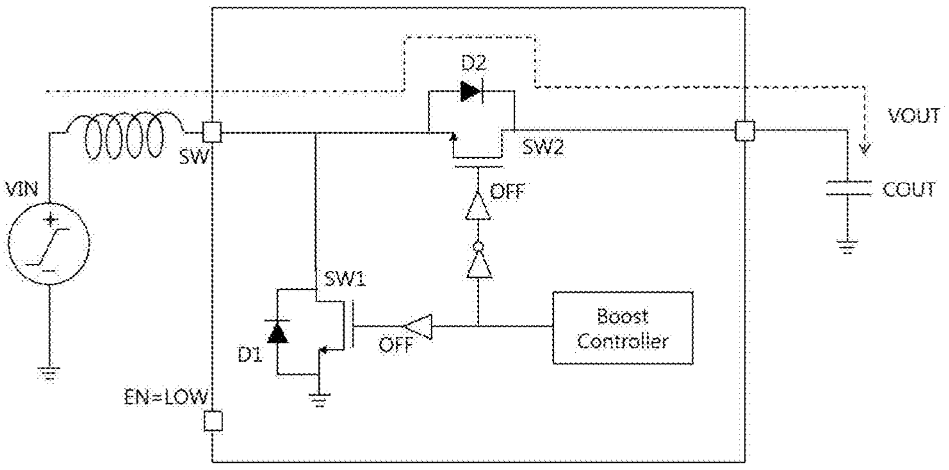
FIG. 1 [PRIOR ART]
FIG. 1 illustrates the structure and operation of a prior art boost converter.
Figure 2:
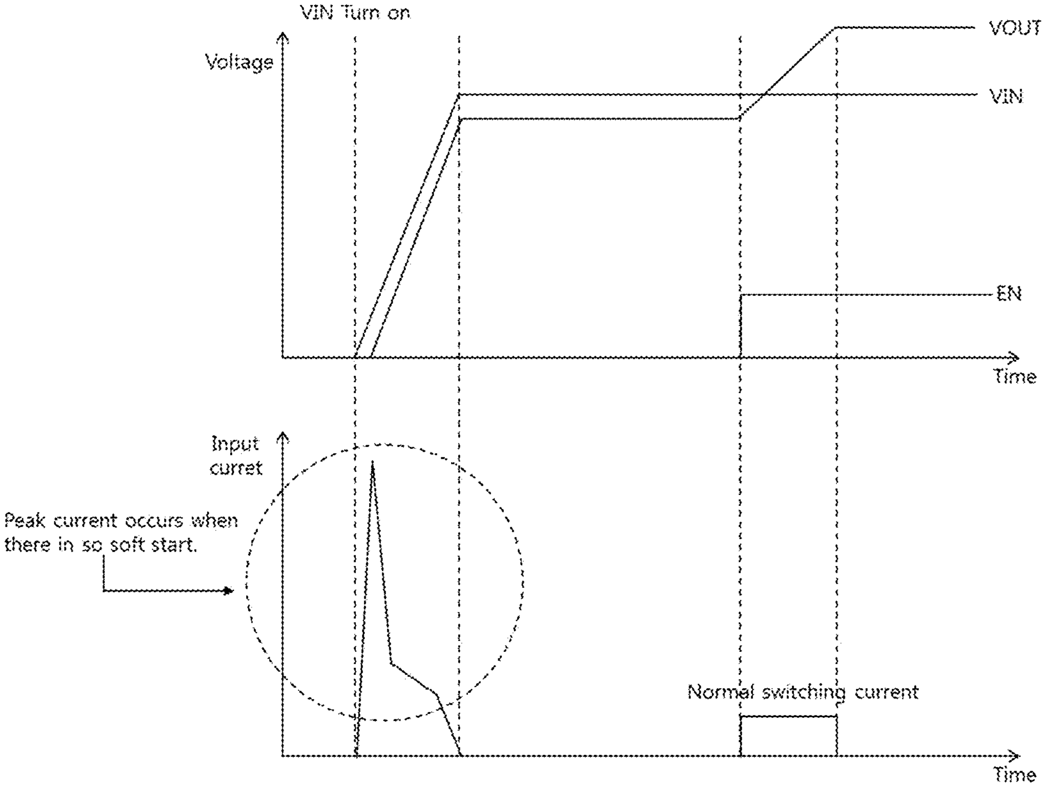
FIG. 2 [PRIOR ART]
FIG. 2 shows time-dependent changes in the output voltage and input current of a prior art boost converter.

The objects, specific advantages, and novel features of the present invention will become apparent from the following detailed description and preferred embodiments in conjunction with the accompanying drawings. It should be noted that in the drawings, the same components are denoted by the same reference numerals even though they are depicted in different drawings. Although such terms as "first" and "second," etc. may be used to describe various components, these components should not be limited by above terms. These terms are used only to distinguish one component from another. In the description of the present invention, detailed explanations of related art are omitted when it is deemed that they may unnecessarily obscure the essence of the present invention.

Preferred embodiments of the present invention will now be described in detail with reference to the accompanying drawings.

Figure 3:
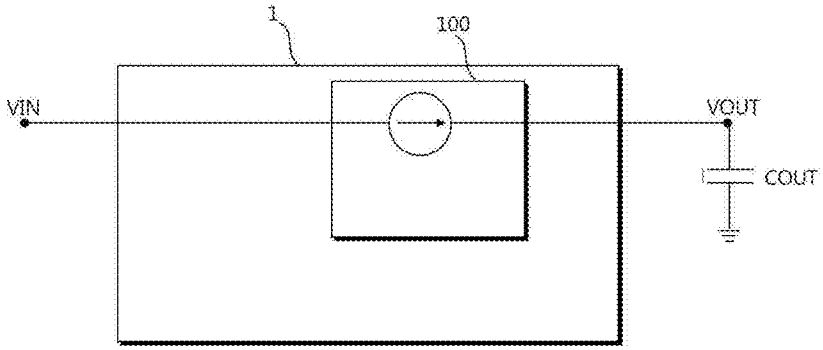
FIG. 3 illustrates the operation of a soft start circuit for a power system according to the present invention.
Figure 4:
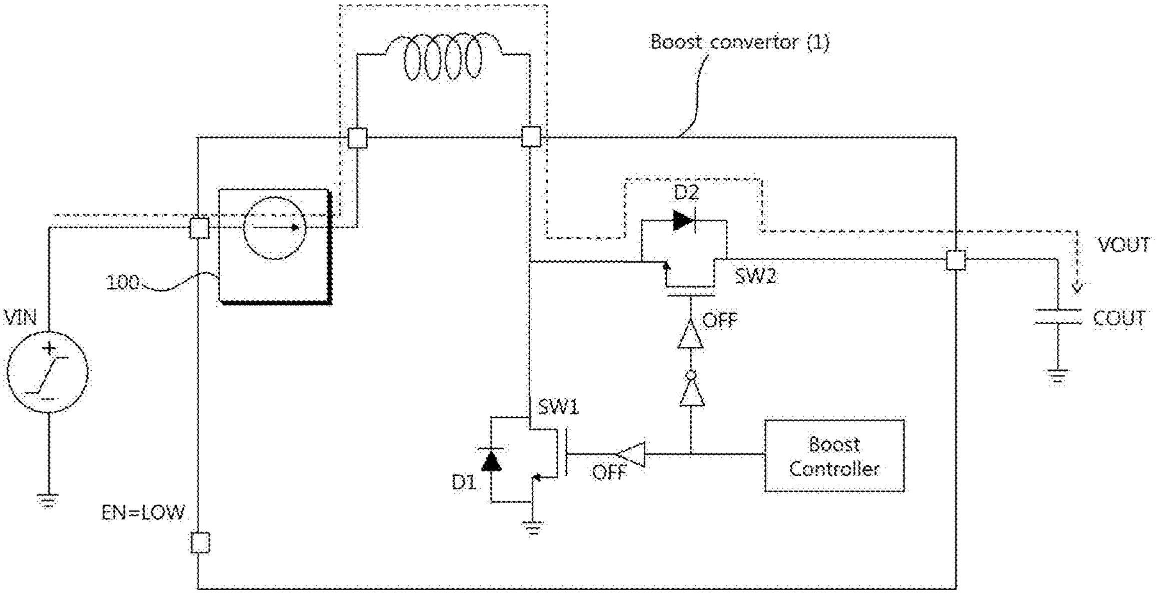
FIGS. 4 and 5 illustrate exemplary embodiments in which a soft start circuit for a power system according to the present invention is applied to boost converters.
Figure 5:
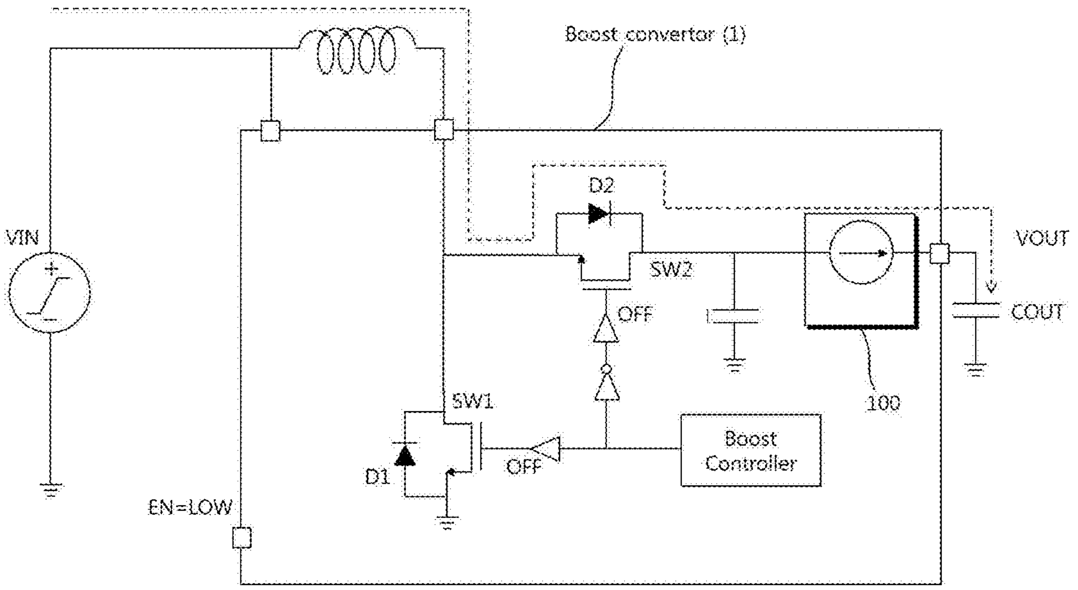
Figure 6:
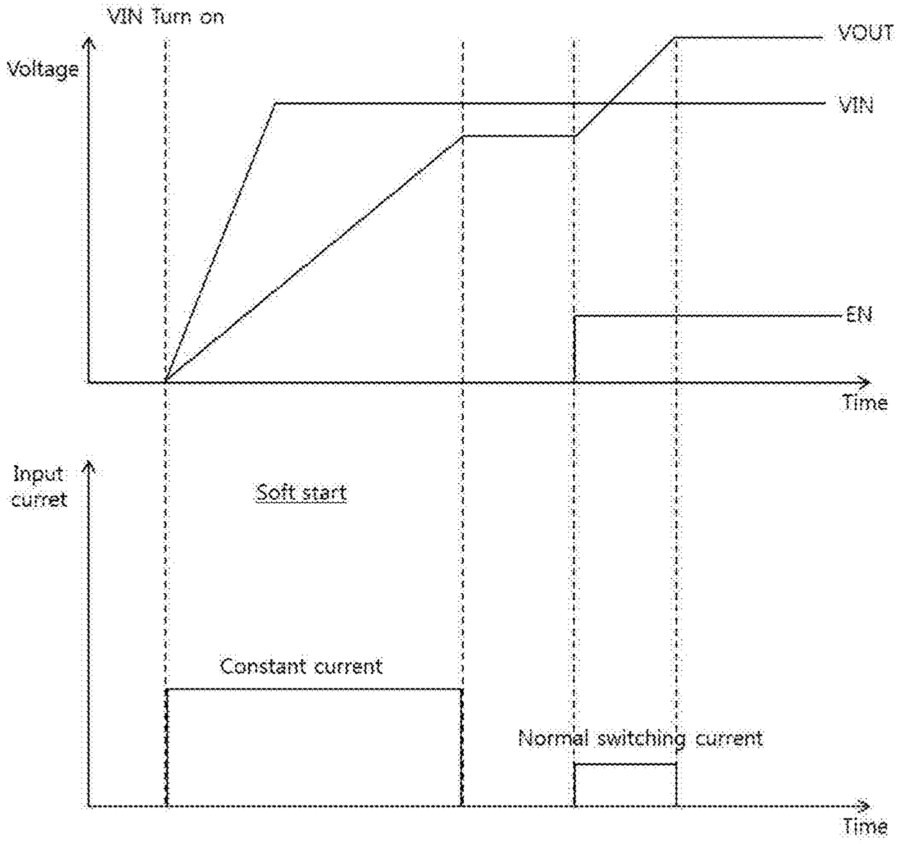
FIG. 6 shows time-dependent changes in the output voltage and input current of a boost converter to which a soft start circuit for a power system according to the present invention is applied.

FIG. 3 illustrates the operation of a soft start circuit for a power system according to the present invention, FIGS. 4 and 5 illustrate exemplary embodiments in which the soft start circuit of the present invention is applied to boost converters, and FIG. 6 shows time-dependent changes in the output voltage and input current of a boost converter to which the soft start circuit of the present invention is applied.

As illustrated in FIGS. 3 to 5, the soft start circuit 100 of the present invention is designed in which an input voltage VIN is applied to charge an output capacitor COUT and output an output voltage VOUT such that a soft start of the power system is achieved wherein a constant current is supplied onto an electrical path connecting the input voltage VIN and the output voltage VOUT to charge the output capacitor COUT at the soft start time.

The present invention is directed to a circuit that uses a constant current with low process-voltage-temperature (PVT) variations to short-circuit input and output ends and charge a capacitor of the output end during the soft-start period of a power system. In a conventional boost converter as a type of power system, when an enable (EN) terminal is low, i.e. in the early stage when two power switches are in the "off" state, the application of an input voltage forms an electrical path between the input voltage and an output voltage. The formation of the electrical path leads to an unintentional increase in the charging current of an output capacitor, causing damage to a chip. The present invention has been devised as a solution to this problem.

The power system 1 to which the soft start circuit 100 of the present invention is applied is not necessarily limited to a boost converter. The soft start circuit 100 can be applied to various power systems that charge output capacitors such as power loss protection (PLP) circuits for energy storage and thereafter supply power to electronic devices and electronic loads.

Specifically, the soft start circuit 100 of the present invention is designed in which a constant current is supplied onto an electrical path connecting an input voltage VIN and an output voltage VOUT to charge an output capacitor COUT at the soft start time, achieving a soft start of the power system 1. The soft start time refers to the time when the output capacitor COUT of the power system 1 is initially charged to the maximum by the input voltage VIN. For a boost converter, when the input voltage VIN is applied in a situation where an enable (EN) terminal is low, the soft start time may refer to the time it takes for the output voltage VOUT to be charged up to the input voltage VIN. In the case where a diode of a power switch interrupts the electrical path connecting the input voltage VIN and the output voltage VOUT, the soft start time can be defined as the time when the output voltage VOUT is charged up to a voltage value obtained by subtracting a forward voltage of the diode from the input voltage VIN because the output voltage VOUT cannot be charged up to the input voltage VIN by the forward voltage of the diode.

The soft start circuit 100 of the present invention is designed in which a constant current is supplied onto the electrical path connecting the input voltage VIN and the output voltage VOUT at the soft start time to isolate the input voltage VIN and the output voltage VOUT.

Since the soft start circuit of the present invention is used as a constant current source to achieve a soft start regardless of the slew rate of the input voltage, a reduction in peak current is achieved, enabling stable charging of the output capacitor COUT.

For example, when the soft start circuit 100 of the present invention is applied to boost converters, as illustrated in FIGS. 4 and 5, it may be electrically connected as a constant current source to any location on the electrical path connecting the input voltage VIN, an inductor, a diode of a power switch, and the output voltage VOUT. In this case, a soft start is achieved, allowing the output capacitor COUT to be gradually charged by a constant current without any peak current (see FIG. 6).

A description will be given concerning the configuration of a soft start circuit 100 according to an exemplary embodiment of the present invention that operates as a constant current source.

Figure 7:
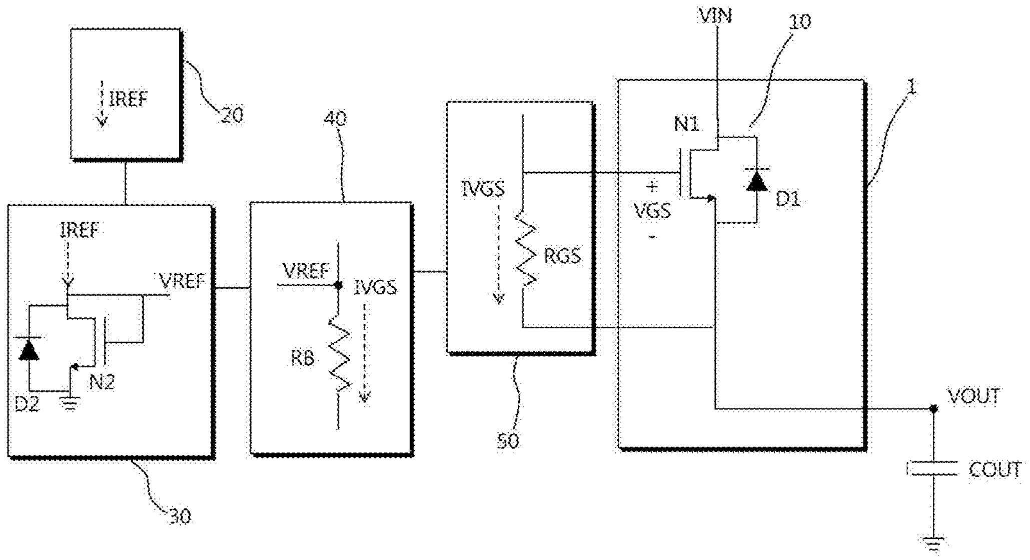
FIG. 7 is a block diagram illustrating the configuration of a soft start circuit for a power system according to the present invention.
Figure 8:
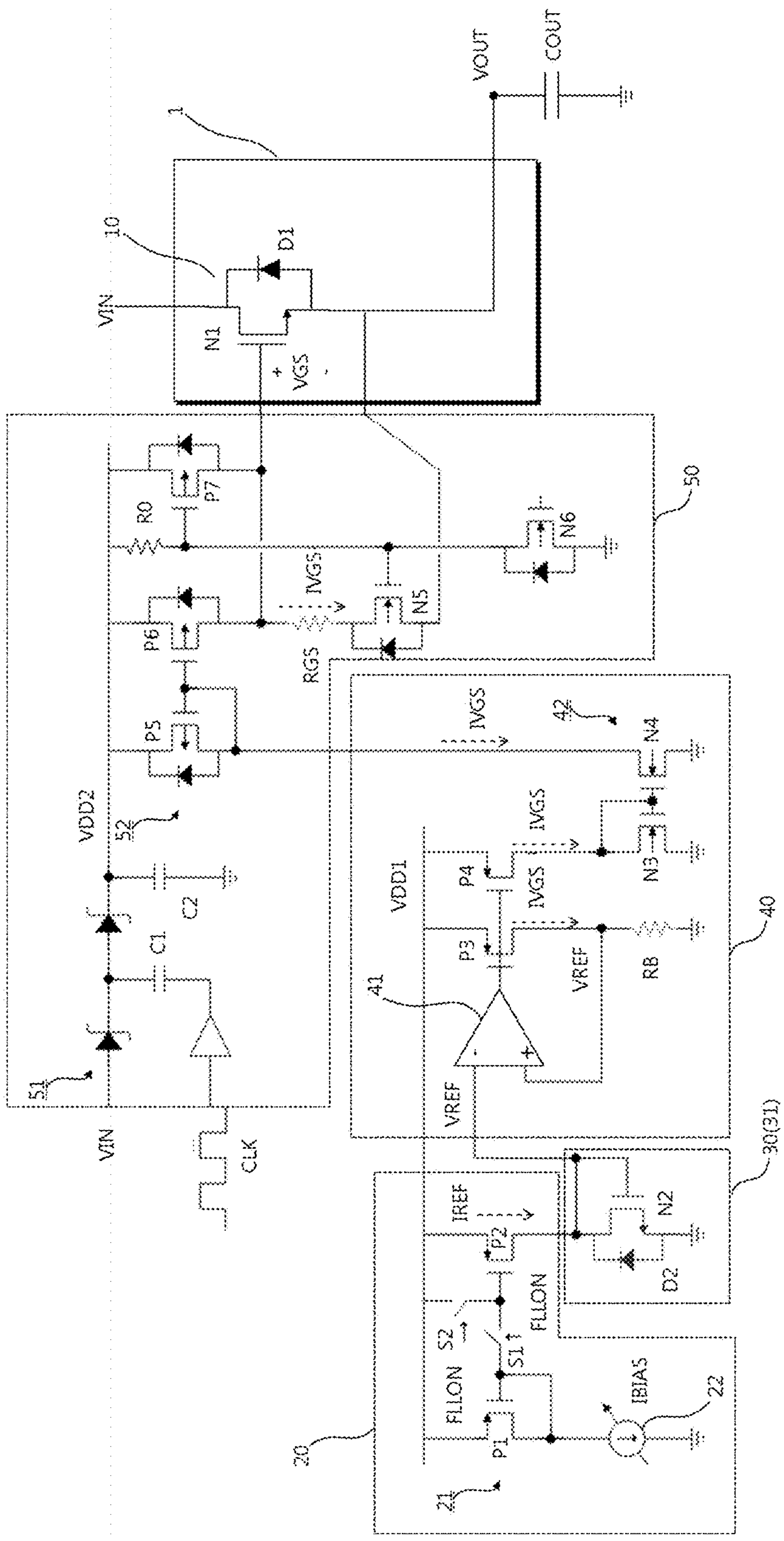
FIG. 8 is a circuit diagram illustrating a soft start circuit for a power system according to an exemplary embodiment of the present invention.

FIG. 7 is a block diagram illustrating the configuration of the soft start circuit and FIG. 8 is a circuit diagram illustrating the soft start circuit.

Referring to FIGS. 7 and 8, the soft start circuit includes a blocking transistor 10, a reference current generator 20, a reference voltage generator 30, a voltage-current converter 40, and a blocking transistor controller 50.

The blocking transistor 10 includes a first NMOS N1 and a first diode D1. The first NMOS N1 includes a drain electrically connected to an input voltage VIN and a source electrically connected to an output voltage VOUT, thereby enabling its connection onto an electrical path connecting the input voltage VIN and the output voltage VOUT. The first diode D1 includes an anode connected to the source of the first NMOS N1 and a cathode connected to the drain of the first NMOS N1, thereby enabling its electrical connection between the source and the drain of the first NMOS N1.

The reference current generator 20 generates a reference current IREF. For example, the reference current generator 20 may be implemented by a first current mirror 21 and a current source 22. The first current mirror 21 includes a first PMOS P1 and a second PMOS P2 that form a current mirror structure. A first operating voltage VDD1 is applied to a source of each of the first PMOS P1 and the second PMOS P2 and a gate of the first PMOS P1 is electrically connected to a gate of the second PMOS P2 and a drain of the first PMOS P1 to form a current mirror structure. The current source 22 is electrically connected between the drain of the first PMOS P1 and a ground. With this electrical connection, when a bias current IBIAS is supplied, a reference current IREF is generated in and flows through the second PMOS P2.

The generation of the reference current IREF can be controlled by connecting a first switch S1 onto an electrical path between the gate of the first PMOS P1 and the gate of the second PMOS P2 and a second switch S2 between the electrical path and the first operating voltage VDD1. Accordingly, a current mirror structure is formed only when a switching control signal is applied such that the first switch S1 is in the "on" state and the second switch S2 is in the "off" state. By the formation of the current mirror structure, the reference current generator 20 is turned on to generate the reference current IREF. That is, the reference current generator 20 has an "on/off" function. This function can minimize power consumption by turning off the reference current generator 20 after completion of soft start.

The reference voltage generator 30 senses the reference current IREF generated by the reference current generator 20 to generate a reference voltage VREF. For example, the reference voltage generator 30 may include a sense transistor 31. The sense transistor 31 may be implemented by a second NMOS N2 and a second diode D2. The second NMOS N2 includes a drain, a gate electrically connected to the drain, and a grounded source. The second diode D2 includes an anode connected to the source of the second NMOS N2 and a cathode connected to the drain of the second NMOS N2, thereby enabling its electrical connection between the source and the drain of the second NMOS N2. The drain of the second NMOS N2 is electrically connected to the drain of the second PMOS P2, and as a result, the reference current IREF generated in the second PMOS P2 flows through the sense transistor 31 to generate the reference voltage VREF.

The second NMOS N2 of the sense transistor 31 and the first NMOS N1 of the blocking transistor 10 may be the same N-channel MOSFETs. That is, the first NMOS N1 and the second NMOS N2 may use the same high voltage MOSFETs. For example, the first NMOS N1 and the second NMOS N2 may be devices that have the same threshold drain-source voltage and are fabricated by the same process, enabling the application of zero process-voltage-temperature (PVT) variation.

The voltage-current converter 40 receives the reference voltage VREF generated by the reference voltage generator 30 to generate a conversion current IVGS. The voltage-current converter 40 includes a first resistance RB and generates the conversion current IVGS as the ratio of the reference voltage VREF to the first resistance RB (VREF/RB). As a specific example, the voltage-current conversion unit 40 may include an OP AMP 41, a third PMOS P3, a fourth PMOS P4, and a second current mirror 42.

The OP AMP 41 includes a (−) input terminal electrically connected to the gate of the second NMOS N2 of the sense transistor 31 and a (+) input terminal electrically connected to the first resistance RB. One end of the first resistance RB is grounded and the other end of the first resistance RB is connected to the (+) input terminal of the OP AMP 41.

The third PMOS P3 includes a source to which the first operating voltage VDD1 is applied, a gate electrically connected to an output end of the OP AMP 41, and a drain electrically connected to a first node to which the first resistance RB and the (+) input terminal of the OP AMP 41 are connected.

The fourth PMOS P4 includes a source to which the first operating voltage VDD1 is applied and a gate electrically connected to the output end of the OP AMP 41. The same P-channel MOSFET used for the third PMOS P3 is used for the fourth PMOS P4.

The second current mirror 42 includes a third NMOS N3 and a fourth NMOS N4 that form a current mirror structure. Each of the third NMOS N3 and the fourth NMOS N4 includes a grounded source. A gate of the third NMOS N3 is electrically connected to a gate of the fourth NMOS and a drain of the third NMOS N3. The drain of the third NMOS N3 is also electrically connected to the drain of the fourth NMOS N4.

When the reference voltage VREF is applied to the (−) input terminal of the OP AMP 41 of the voltage-current converter 40, the conversion current IVGS is generated as the ratio of the reference voltage VREF to the first resistance RB (VREF/RB) and flows through the third PMOS P3. Since the same P-channel MOSFET used for the third PMOS P3 is used for the fourth PMOS P4, the conversion current IVGS also flows through the fourth PMOS P4. The conversion current IVGS is copied by the second current mirror 42, and as a result, it flows through the fourth NMOS N4.

The blocking transistor controller 50 receives the conversion current IVGS to generate a gate-source voltage VGS of the first NMOS N1 of the blocking transistor 10 and supplies the gate-source voltage VGS to the blocking transistor 10. The blocking transistor controller 50 includes a second resistance RGS and generates the gate-source voltage VGS of the first NMOS N1 as the product of the conversion current IVGS and the second resistance RGS (IVGSXRGS). As a specific example, the blocking transistor controller 50 may include a charge pump 51 and a third current mirror 52.

The charge pump 51 steps up the input voltage VIN to output a second operating voltage VDD2. The charge pump 51 is implemented by diodes, capacitors, and a pulse input, as illustrated in FIG. 8, but is not necessarily limited thereto. The charge pump 51 is not particularly limited as long as it is capable of stepping up the input voltage VIN to output the second operating voltage VDD2.

The third current mirror 52 includes a fifth PMOS P5 and a sixth PMOS P6 that form a current mirror structure. The second operating voltage VDD2 is applied to a source of each of the fifth PMOS P5 and the sixth PMOS P6. The fifth PMOS P5 includes a drain electrically connected to the drain of the fourth NMOS N4. One end of the second resistance RGS is electrically connected to the electrical path connecting the input voltage VIN and the output voltage VOUT. The other end of the second resistance RGS, a drain of the sixth PMOS P6, and a gate of the first NMOS N1 are electrically connected to a second node.

Accordingly, the conversion current IVGS copied to the fourth NMOS N4 of the second current mirror 42 is copied by the third current mirror 52, and as a result, the gate-source voltage VGS of the first NMOS N1 is generated as the product of the conversion current IVGS and the second resistance RGS (IVGSXRGS) while flowing through the second resistance RGS.

The blocking transistor 10 needs to be switched fully "on" when charging of the output capacitor COUT is completed, i.e. after a soft start. To this end, the blocking transistor controller 50 may further include a seventh PMOS P7, a third resistance R0, a fifth NMOS N5, and a sixth NMOS N6.

The seventh PMOS P7 includes a source to which the second operating voltage VDD2 is applied and a drain electrically connected to the second node.

One end of the third resistance R0 is electrically connected to the second operating voltage VDD2 and the other end of the third resistance R0 is electrically connected to a gate of the seventh PMOS P7 through a third node.

The fifth NMOS N5 includes a drain electrically connected to the one end of the second resistance RGS, a source electrically connected to the electrical path connecting the input voltage VIN and the output voltage VOUT, and a gate electrically connected to the third node.

The sixth NMOS N6 includes a drain electrically connected to the third node and a grounded source. The sixth NMOS N6 operates in a complementary manner to the seventh PMOS.

The sixth NMOS N6 is in the "off" state at the soft start time. At this time, the seventh PMOS P7 complementary to the sixth NMOS N6 also becomes the "off" state and the fifth NMOS N5 becomes the "on" state.

Upon completion of a soft start, the sixth NMOS N6 is switched to the "on" state. Thus, the seventh PMOS P7 becomes the "on" state and the fifth NMOS N5 becomes the "off" state, with the result that the blocking transistor 10 can be switched fully "on".

The first resistance RB and the second resistance RGS may be elements having the same resistance value, which is suitable for the application of zero PVT variation. In this case, the gate-source voltage VGS of the first NMOS N1 becomes the same as the reference voltage VREF, as explained by Equations 1:

$$RB=RGS$$

$$IVGS=VREF/RB$$

$$VGS=IVGS\times RGS=(VREF/RB)\times RGS=VREF \qquad (1)$$

where RB is the first resistance, RGS is the second resistance, IVGS is the conversion current, VREF is the reference voltage, and VGS is the gate-source voltage of the first NMOS N1.

It is preferable that the first resistance RB and the second resistance RGS are constructed by the same process. This eliminates errors due to PVT variations between the blocking transistor 10 and the sense transistor 31.

Under the condition RB=RGS, the sense transistor 31 and the blocking transistor 10 operate as constant current sources. The connection of the first diode D1 allows the sense transistor 31 to operate as a constant current source. Since the sense transistor 31 is always saturated, the size of the constant current source can be freely changed by simply varying the reference current IREF and bias current IBIAS.

Although the present invention has been described herein with reference to the foregoing specific embodiments, these embodiments do not serve to limit the invention and are set forth for illustrative purposes. It will be apparent to those skilled in the art that modifications and improvements can be made without departing from the spirit and scope of the invention.

Simple modifications and changes of the present invention belong to the scope of the present invention and the specific scope of the present invention will be clearly defined by the appended claims.

What is claimed is:

1. A soft start circuit for a power system in which an input voltage is applied to charge an output capacitor and output an output voltage such that a soft start of the power system is achieved wherein a constant current is supplied onto an electrical path connecting the input voltage and the output voltage to charge the output capacitor during a soft start period, wherein the soft start circuit comprises: a blocking transistor comprising a first NMOS connected to the electrical path and a first diode electrically connected between a source and a drain of the first NMOS; a reference current generator generating a reference current; a reference voltage generator sensing the reference current to generate a reference voltage; a voltage-current converter comprising a first resistance and receiving the reference voltage to generate a conversion current corresponding to a ratio of the reference voltage to the first resistance; and a blocking transistor controller comprising a second resistance and receiving the conversion current to generate a gate-source voltage of the first NMOS corresponding to a product of the conversion current and the second resistance.

2. The soft start circuit according to claim 1, wherein the power system comprises a boost converter circuit or a power loss protection (PLP) circuit.

3. The soft start circuit according to claim 1, wherein the reference current generator comprises: a first current mirror comprising a first PMOS and a second PMOS, each of which comprises a source to which a first operating voltage is applied and which form a current mirror structure; and a current source electrically connected to the drain of the first PMOS and supplying a bias current to the second PMOS to generate the reference current.

4. The soft start circuit according to claim 3, wherein the reference voltage generator comprises a sense transistor comprising a second NMOS and a second diode electrically connected between a source and a drain of the second NMOS and wherein the drain of the second NMOS is electrically connected to a gate of the second NMOS and a drain of the second PMOS and the source of the second NMOS is grounded.

5. The soft start circuit according to claim 4, wherein the same N-channel MOSFETs are used for the first NMOS and the second NMOS.

6. The soft start circuit according to claim 4, wherein the voltage-current converter comprises: an operational amplifier (OP AMP) comprising a (−) input terminal electrically connected to the gate of the second NMOS such that the reference voltage is applied thereto and a (+) input terminal electrically connected to one end of the first resistance whose the other end is grounded; a third PMOS comprising a source to which the first operating voltage is applied, a gate electrically connected to an output end of the OP AMP, and a drain electrically connected to a first node to which the first resistance and the (+) input terminal of the OP AMP are electrically connected such that the conversion current flows therethrough; a fourth PMOS comprising a source to which the first operating voltage is applied and a gate electrically connected to the output end of the OP AMP and using the same P-channel MOSFET as that for the third PMOS such that the conversion current flows therethrough; and a second current mirror comprising a third NMOS and a fourth NMOS, each of which comprises a grounded source and which form a current mirror structure and are electrically connected to each other such that the conversion current is copied to and flows through the fourth NMOS.

7. The soft start circuit according to claim 6, wherein the blocking transistor controller comprises: a charge pump stepping up the input voltage to output a second operating voltage; and a third current mirror comprising a fifth PMOS and a sixth PMOS, each of which comprises a source to which the second operating voltage is applied and which form a current mirror structure, and wherein the fifth PMOS comprises a drain electrically connected to a drain of the fourth NMOS such that the conversion current is copied to and flows through the sixth PMOS and one end of the second resistance whose the other end is electrically connected to the electrical path, a drain of the sixth PMOS, and a gate of the first NMOS are electrically connected to a second node.

8. The soft start circuit according to claim 7, wherein the first resistance and the second resistance are elements having the same resistance value.

9. The soft start circuit according to claim 7, wherein the blocking transistor controller further comprises: a seventh PMOS comprising a source to which the second operating voltage is applied and a drain electrically connected to the second node; a third resistance whose one end is electrically connected to the second operating voltage and the other end is electrically connected to a gate of the seventh PMOS and a third node; a fifth NMOS comprising a drain electrically connected to the other end of the second resistance, a source electrically connected to the electrical path, and a gate electrically connected to the third node; and a sixth NMOS comprising a drain electrically connected to the third node and a grounded source and operating in a complementary manner to the seventh PMOS.

10. The soft start circuit according to claim 9, wherein the fifth NMOS is in the "on" state and the sixth NMOS and the seventh PMOS are in the "off" state at the soft start time, and the fifth NMOS is controlled to the "off" state and the sixth NMOS and the seventh PMOS are controlled to the "on" state when the soft start is completed.

* * * * *